Feb. 24, 1931.  C. A. PRESSNALL  1,793,748
SELF GOVERNING WIND MOTOR
Filed Aug. 1, 1928  3 Sheets-Sheet 1
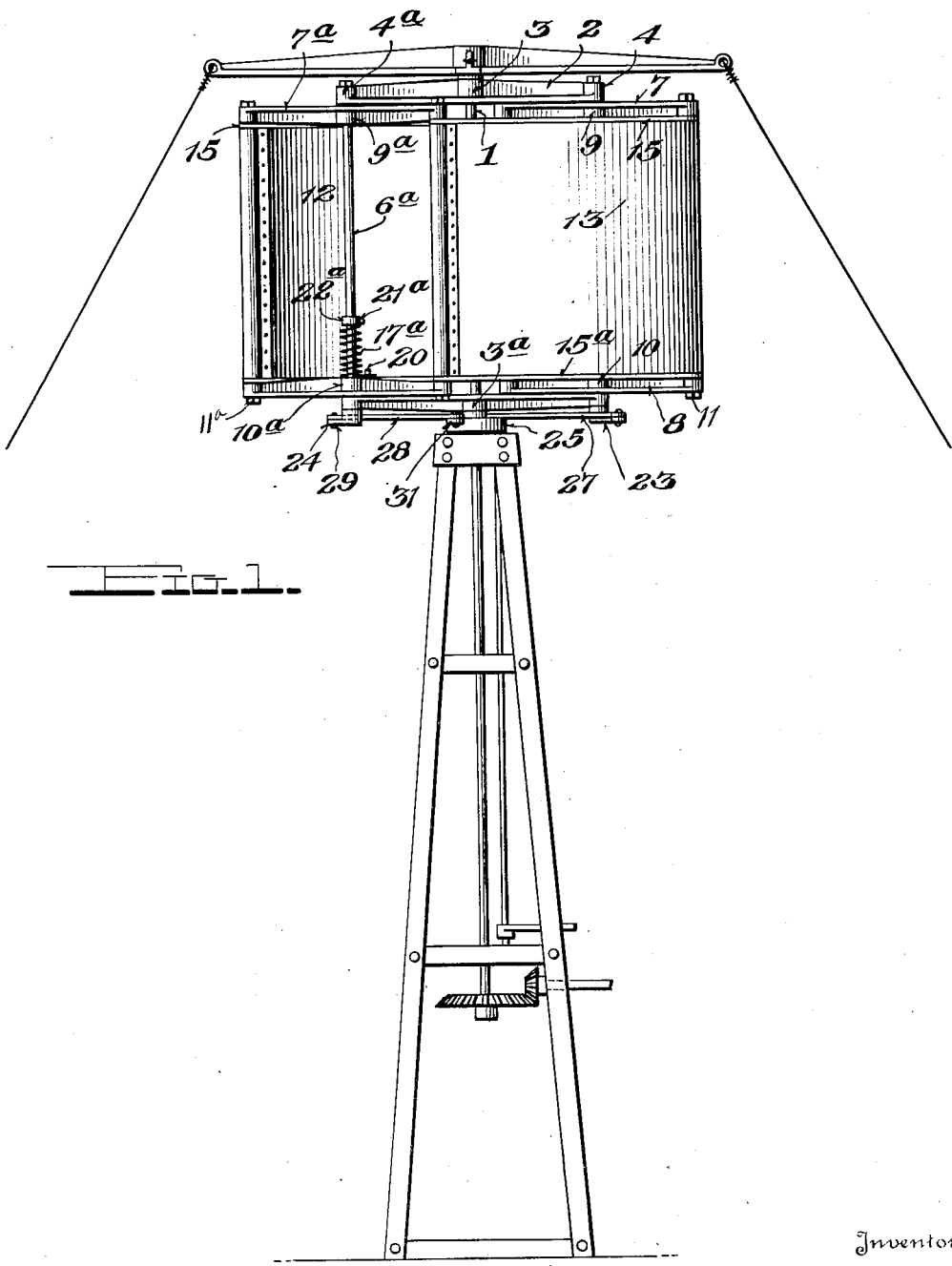
Inventor
Charles A. Pressnall,
By Lester Sargent
Attorney

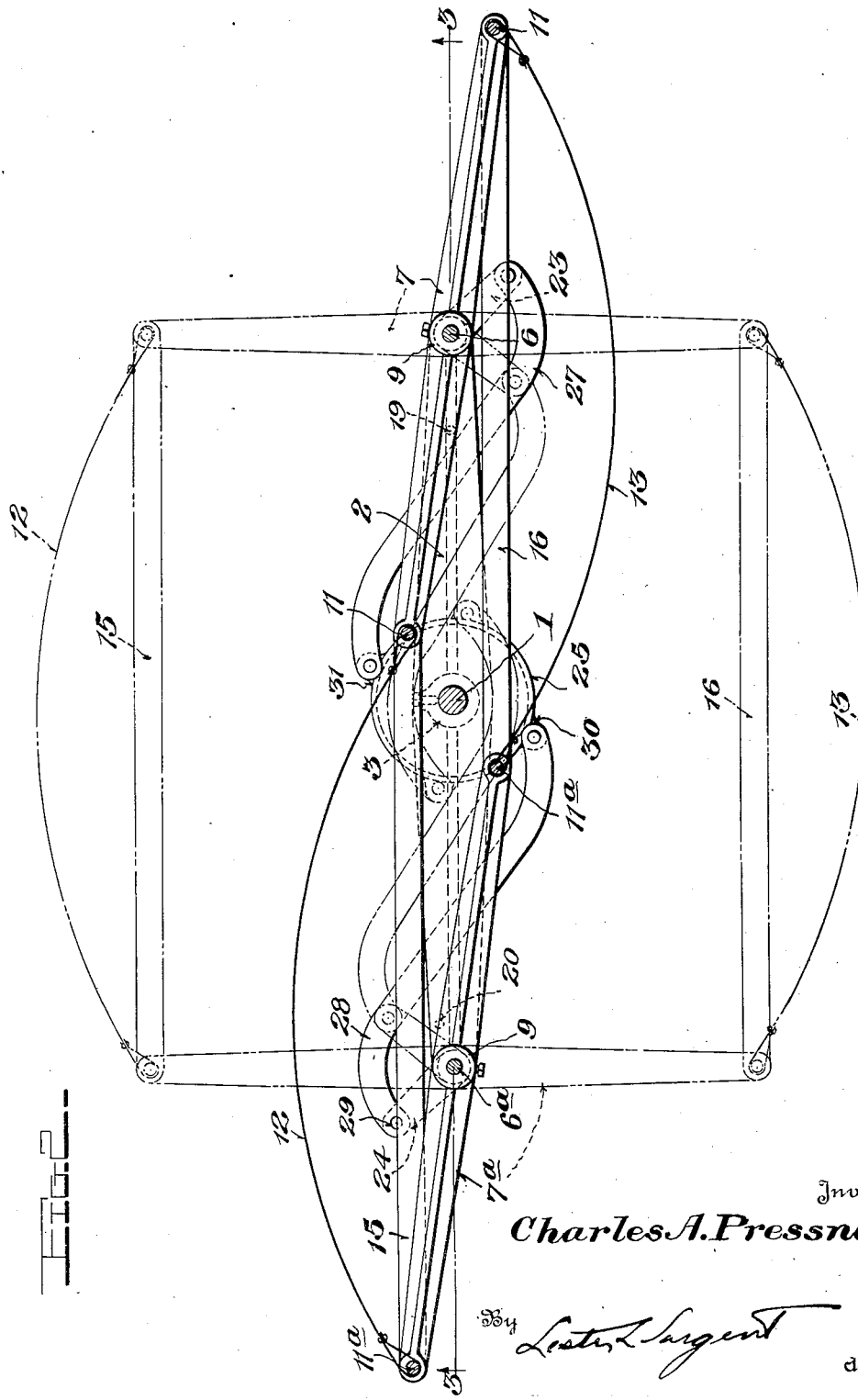

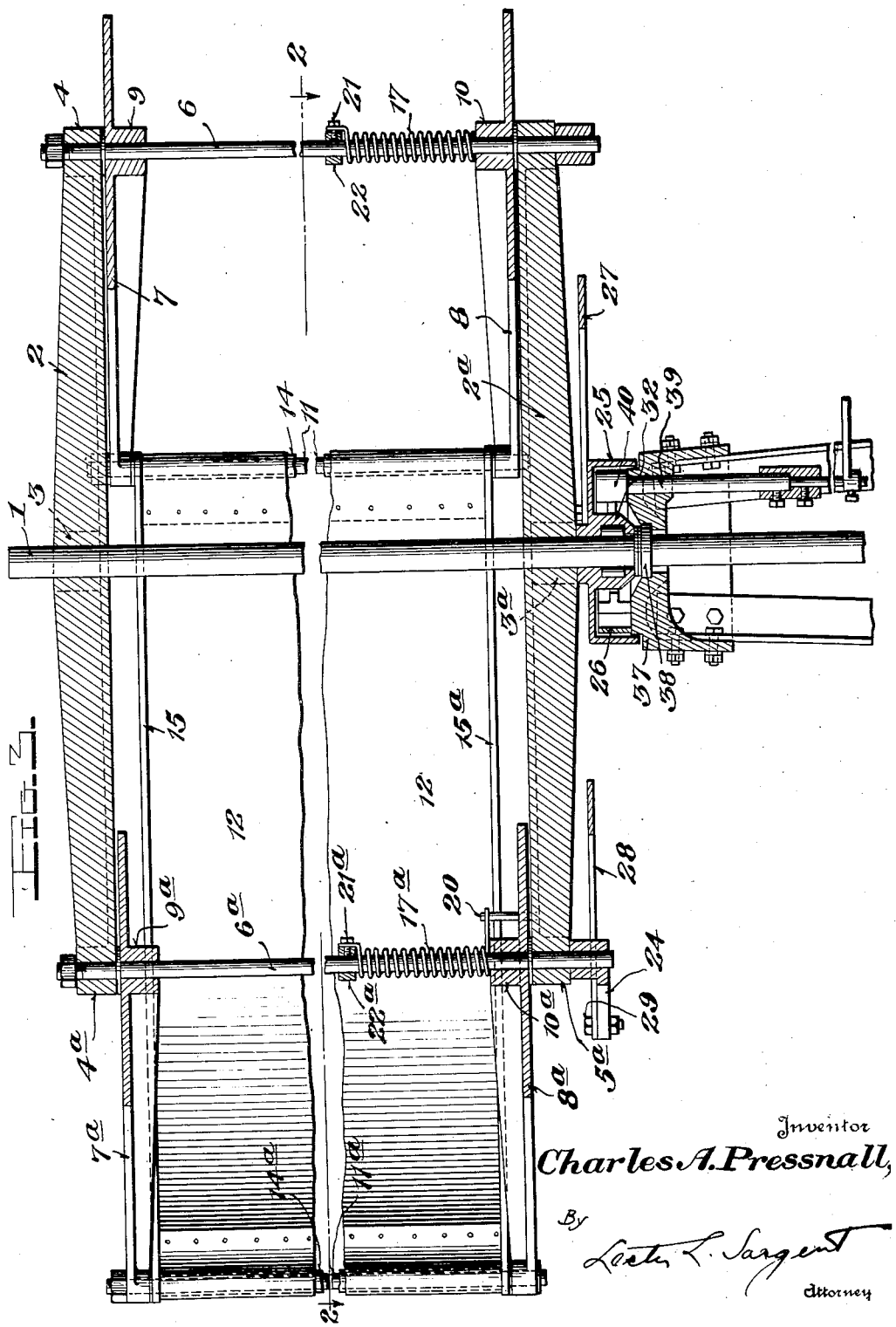

Patented Feb. 24, 1931

1,793,748

UNITED STATES PATENT OFFICE

CHARLES ALVAH PRESSNALL, OF ELKHART, INDIANA

SELF-GOVERNING WIND MOTOR

Application filed August 1, 1928. Serial No. 296,705.

My invention relates to a self-governing wind motor having two curved vanes disposed vertically and with a common rotatable vertical axis.

The object of my invention is to provide automatic and practically constant speed control above a predetermined wind velocity by means of the combined and simultaneous effect of wind pressure and centrifugal force acting directly on said vanes.

It is also an object of my invention to provide a simple and effective structure coordinating to automatically and simultaneously vary the effective vane area and relative vane position through the combined effect of wind pressure and centrifugal force, substantially as illustrated and hereinafter more fully described.

It is a further object to provide a simple structure insuring a perfect balance of the rotating parts at all speeds and vane positions.

It is a further object to provide a structure presenting a maximum effective vane area efficiently positioned in relation to the wind and main vertical shaft when in the initial operating position; and a minimum effective vane area disposed uniformly central around said shaft and widely separated therefrom when in the inoperative or neutral position.

A further object of my invention is to provide a simple and effective means of either manually or automatically altering the position of said vanes in relation to each other and the main shaft in such manner that the device will be inoperative, or conversely, operative, substantially as illustrated and described hereinafter.

I attain the foregoing and other objects of my invention by the apparatus illustrated in the accompanying drawings, in which,—

Figure 1 is a side elevation of the entire apparatus;

Fig. 2 is a horizontal section on line 2—2 of Fig. 3, the solid lines indicating the normal operating or running position of parts while the dotted lines indicate the inoperative or stationary position; and Fig. 3 is a vertical section on line 3—3 of Fig. 2.

Like numerals designate like parts in each of the several views.

Referring to the accompanying drawings, I provide a main vertical shaft 1 to which is keyed or otherwise rigidly secured the main frame members 2 and 2a. These members are horizontally disposed and in alinement with each other. The frame members are provided with centrally located hubs 3 and 3a which are bored and keywayed to fit the shaft 1. The frame members 2 and 2a are ribbed as shown and taper outwardly from center to their extremities, where they are provided with hubs or bosses 4 and 4a, and 5 and 5a, respectively, which are drilled to receive the rods 6 and 6a as shown. These rods have a bearing fit in said hubs or bosses, so that they are free to turn therein.

Immediately below the upper frame member 2, and above the lower frame member 2a and at their outer extremities, the vane arms 7 and 7a and 8 and 8a are mounted. These four vane arms are similar in construction and formation, but somewhat smaller than the frame members 2 and 2a. They are provided with hubs 9 and 9a and 10 and 10a centrally located, which are drilled to receive the rods or shafts 6 and 6a, to which they are rigidly secured by means of suitable fastening elements 6b such as lock nuts, set screws, or otherwise, in the positions shown. The vertical vane rods of shafts 6, 6a must be rigidly secured to their respective vane arms but turn freely in the bearing provided in the main frame members. This is accomplished by means of the lock nuts 6b or other suitable means.

The outer extremities of these vane arms are provided with hubs or bosses which are drilled to receive the vane rods 11 and 11a, which turn freely therein.

The curved vanes 12 and 13 are preferably of sheet metal, the diametrically vertical edges of which are preferably formed around suitable tubes or pipes 14 and 14a, as shown, and secured by rivets or otherwise. The vane members are constructed preferably of thin sheet material such as sheet iron and these sheets before being assembled on the rods lie straight and flat which facilitates their shipment and handling. When assembled they are rigid as previously determined by the spacing of the rods and spread or width of vane and are necessarily rigid when assembled for the successful operation of the device. The tubes 14 and 14a act as bearings and should fit freely the rods 11 and 11a, permitting these rods to turn freely therein.

At the upper and lower extremity of each curved vane, a spreader bar 15 and 15a is provided, with holes near their extremities to receive the vane rods 11 and 11a as shown. These spreader bars add to the vane rigidity and maintain the predetermined curvature of the vanes 12 and 13.

Immediately above the vane arm hubs 10 and 10a, suitably coiled springs 17 and 17a are positioned over the rods or shafts 6 and 6a as shown. The lower end of each spring extends outwardly and engages the vertical pins 19 and 20 which are rigidly secured to the lower frame member 2a. The opposite or upper end of each spring engages set screws 21 and 21a or equivalent. These set screws lock the collars 22 and 22a rigidly to the rods or shafts 6 and 6a. The collars 22 and 22a may be turned on their respective rods, thus winding up the springs to the required degree to provide tension in a direction to force the vanes outwardly in the normal running position indicated in solid lines in Fig. 2.

The tension of each spring may vary in relation to the other, as the sum of this tension is distributed equally to both vanes through the connecting levers or arms. The initial tension may be set to obtain control at any desired speed or wind velocity. The component elements of each vane assembly is identical with that of the other.

There is a distinct advantage in the use of these springs over that of centrifugal weights. These two springs in my structure may be adjusted torsionally to the required tension. The required tension is the sum of the two torsion springs. One of them may actually have more tension than the other with the result that the sum of this combined tension is equalized on both vanes through the particular and special manner of vane mounting on the vane-arms.

Obviously, when such unequal tension of the two torsion springs is effected, there will be no unbalanced condition respecting the vanes and their related parts, because this tension is equalized through the vane-arms and rods.

Now, when centrifugal weights are employed, it will be equally obvious that increased difficulty will prevail in adjusting said weights to the proper values, for unless this is actually accomplished accurately, unbalanced conditions will prevail and excessive vibration result. It can be readily seen that accurate adjustments are a practical impossibility.

Again, in my torsional spring structure, if one or both springs should break while the motor was rotating at any speed, all or part of the tension would be lost, resulting in the vanes moving out of the wind and an immediate reduction of R. P. M.; while in the case of centrifugal weights, if one or more weights become displaced or fly off, a greatly increased unbalance would result, setting up increased stresses and vibration, while in my structure, no effect on balance would result.

Weights, of whatever kind or type will sometime work loose—at least there is always a possibility of them doing so, and there are cases on record of where such rotating weights became loosened, flew off and narrowly missed striking the owner or his stock.

From the standpoint of safety alone, the spring is decidedly advantageous, especially when employed as in my device, where spring breakage results in immediate control of the vanes out of the wind.

If the wind is of sufficient velocity, the vanes will move to the extreme "out of the wind" or inoperative position and remain locked there by virtue of the fulcrum points of the two curved arms being on dead center.

In respect to the "dead-center" feature of the fulcrums of the crank arms, curved arms and clutch housing, this dead-center position serves as an automatic lock to hold the vanes in the inoperative position when they are once forced there by virtue of wind pressure, centrifugal force or both, because, even when under great spring tension tending to pull the vanes back in the operative position, this dead-center effectually prevents such action, because the spring tension is exerted on a dead-center.

While the clutch housing was, and is yet intended to enable the operator to manually cause the vanes to assume the inoperative position through the medium of the internal clutch, the dead-center feature respecting the crank-arm, curved arm fulcrums is an automatic lock out of operation in case of excessively high wind velocity or in case of spring breakage at lesser wind velocities.

This combination of features, all operating on the side of safety and efficiency, depends upon the component elements as described. Equally effective and efficient results could not be obtained with weights.

Referring to Fig. 3, the vane arms 7 and 7a and 8 and 8a are rigidly secured to their respective rods or shafts by means of set screws or otherwise, as previously explained, the arm 7a being in alinement with the arms 8a directly below; likewise the arm 7 is in alinement with arm 8 directly below. These arms being rigidly secured to their respective shafts 6 and 6a will cause an increase of spring tension as the vanes move toward the position shown in dotted lines in Fig. 2.

With reference to Fig. 2 it will be noted that the normal position of the arms 7 and 7a is slightly offset from a plane parallel to the frame members 2 and 2a, and that the outer extremity of arm 7 is connected to the outer extremity of vane 13 while the opposite or inner extremity of arm 7 is connected to the inner extremity of vane 12. Likewise the outer extremity of arm 7a is connected to the outer extremity of vane 12, while the opposite or inner extremity of arm 7a connects with the inner extremity of vane 13. The full movement or throw of these arms is something less than 90 degrees, as illustrated.

The entire structure may be assembled for either right or left hand rotation, as desired, without any alterations whatever.

In Fig. 2, consider the wind blowing against the concave side of vane 12 and the convex side of vane 13. It will be evident that the effective pressure will be greater against the vane 12. Now if the main shaft 1 is held rigid and sufficient wind pressure to overcome the tension of the springs 17 and 17a is applied, the vane 12 will move back and vane 13 will move forward toward their respective dotted line position. If the main shaft is released, the springs will force the vanes to the full normal running position and the wind pressure will cause the entire assembly to rotate clockwise. If sufficient speed is attained, centrifugal force will cause the vanes and associated parts to move toward the dotted line position, the wind pressure and centrifugal force acting together in the same general direction, but in their independent relative degrees.

For instance, it will be noted that while the device is rotating, the effect of centrifugal force will be constant at any given speed, while the factor of effective pressure against the vanes will vary with the position of the vanes. Also the factor of pressure will be impulsive, that is, two impulses per revolution.

At a given wind velocity or speed of rotation and as the vanes swing towards the dotted line position, indicated, the effective vane area and consequently the effective pressure and centrifugal force decreases, while the spring tension and load increases, thus eventually a condition will obtain wherein the speed will not increase materially regardless of the increase in wind velocity or pressure. Conversely, the speed of rotation will not decrease in the higher wind velocities or pressures for the reason that the vanes will not entirely assume the neutral or dotted line position shown in Fig. 2, but under the action of spring tension will tend to maintain a position a definite effective degree in the wind, depending on the factors of speed, pressure and load. It is obvious therefore that with a given vane area and weight, the device may be tensioned to start controlling its speed of rotation at any predetermined wind velocity or R. P. M. and maintain a practically uniform R. P. M. at any higher wind velocity or pressure.

For the purpose of placing the vanes in the neutral or inoperative position indicated by dotted lines in Fig. 2, or to cause the vanes to assume their normal running position, as indicated by solid lines in Fig. 2, I provide crank arms 23 and 24 which are drilled to fit the lower extremities of rods or shafts 6 and 6a, respectively, after passing through frame member 2a. These crank arms are suitably and rigidly secured to their respective rods or shafts by means of set screws or otherwise, and are provided preferably with tapped holes near their outer extremities to which are pivotally connected the outer ends of the curved arms 27 and 28, respectively by means of bolts or pins as indicated at 29 in Fig. 3. These bolts or pins 29 have a bearing fit in the curved arms 27 and 28 which permits freedom of movement of said arms. The opposite or inner extremities of said curved arms are likewise pivotally connected to suitable lugs or bosses 30 and 31, provided on the outer wall of the circular clutch housing 25.

The clutch housing 25 is provided with an internal hub 32 which is bored to provide a bearing fit on the main shaft 1. This hub section extends externally above the top of the housing to provide clearance between said housing and the lower rib portion of frame member 2a, which rests directly on top of said housing as shown. The inside wall of this clutch housing is machined to receive the expanding clutch member 26, which is also machined to provide a suitable clearance between its outside face and the inner wall of housing when in normal position. The central portion of clutch member 26 is bored to fit loosely the internal hub of housing, which tends to maintain the clutch member in a central position normally in relation to the said housing. I provide a clutch rod 39 mounted in tower cap 37 and having a suitable head 40 to operate clutch member 26.

It will be observed that when the vanes and associated parts are in any position from full normal to full neutral, that the structure is balanced as the movements of all parts are synchronized and maintain their balanced relation to the axis of rotation.

The vane structure and location with respect to the main shaft is designed to reduce the time period of low torque when the wind is directly against the edges of the vane structure and to increase the effective time period of wind pressure against the face of vanes at all other positions.

It is understood that suitable grease cups or other means of lubrication are to be provided where needed, and that additional main shaft bearings and supports are to be provided if found desirable. It is also understood that the main shaft and clutch rod may extend to any desired location and that other minor details of construction may be varied without departing from the spirit of my invention.

It may be advisable or necessary to support the extreme top of the main shaft by means of guy wires or cables, and I may provide a suitable spider with suitable radial arms with a diameter or spread slightly greater than the spread of the vanes when in running position, such as shown in Fig. 1 of the drawings. Suitable guy wires may be provided and attached to the outer extremities of such arms and anchored in the ground, trees or buildings. The central portion of such spider may be provided with suitable ball or roller bearings and fitted to the extreme upper end of the main shaft in such manner as to clear the rotatable members, thus steadying and stiffening the unsupported end of the main shaft.

It will be understood that power is to be taken from the main vertical shaft by means of suitable gears, pulleys or other means.

The wind from below on Fig. 2 causes pressure on the lower sides of both vanes 12 and 13 and vacuum on the upper sides of these vanes. Now if both vanes were straight or curved alike, with respect to the wind, no movement would take place as the wind pressure would be equal on each vane surface. But vane 12 is curved concave on the windward side, while vane 13 is curved convex on the windward side; less wind is therefore diverted laterally from vane 12 than is the case with vane 13, hence increased wind pressure is exerted on the concave vane 12. Also the wind that passes to the right of vane 12 partially destroys the vacuum in the rear of vane 13, while there is no such destruction of the vacuum to the rear of vane 12; this results in maximum effective pressure on vane 12 and increases the torque developed. Many windmills make use of the vacuum or suction effect, as for instance the two, three or four bladed propeller type and others.

What I claim is:

1. In a self-governing wind motor, the combination of a main shaft, a pair of spaced horizontal main frames affixed to said shaft, vertical rods mounted at opposite outer portions of the main frames, spaced horizontal vane arms mounted on each of the aforesaid vertical rods, springs on each of the vertical rods, each spring having one end adjustably secured to its vertical rod and having the other end attached to the adjacent horizontal frame, vane rods at the opposite outer extremities of each of the aforesaid vane arms, and curved vanes of sheet metal extending from the vane rod of one of the vane arms to the corresponding vane rod of the other vane arm and having the ends of the vanes loosely mounted on said rods.

2. In combination with the apparatus described in claim 1, a crank arm affixed on the lower ends of each of the opposite vertical rods of the main frames, curved arms pivotally connected to the outer ends of said crank arms at one of their ends and pivotally attached to a clutch housing on the main shaft at the other end.

3. In a self-governing wind motor, the combination of a main shaft, a pair of spaced horizontal main frames affixed to said shaft, vertical rods mounted at opposite outer portions of the main frames, spaced horizontal vane arms mounted on each of the aforesaid vertical rods, springs on each of the vertical rods, each spring having one end adjustably secured to its vertical rod and having the other end attached to the adjacent horizontal frame, vane rods at the opposite outer extremities of each of the aforesaid vane arms, curved vanes of sheet metal extending from the vane rod of one of the vane arms to the corresponding vane rod of the other vane arm and having the ends of the vanes loosely mounted on said rods, a crank arm affixed on the ends of each of the opposite vertical rods of the main frames, curved arms pivotally connected to the outer ends of said crank arms at one of their ends and pivotally attached to a clutch housing on the main shaft at the other end, an expansible clutch mounted in the clutch housing, and means for actuating the clutch.

4. In a self-governing wind motor, the combination of a main shaft, a pair of spaced horizontal main frames affixed to said shaft, vertical rods mounted at opposite outer portions of the main frames, spaced horizontal vane arms mounted on each of the aforesaid vertical rods, springs on each of the vertical rods, each spring having one end adjustably secured to its vertical rod and having the other end attached to the adjacent horizontal frame, vane rods at the opposite outer extremities of each of the aforesaid vane arms, curved vanes of sheet metal extending from the vane rod of one of the arms to the corresponding vane rod of the other vane arm and having the ends of the vanes loosely mounted on said rods, a crank arm affixed on the ends of each of the opposite vertical rods of the main frames, and curved arms pivotally connected to the outer ends of said crank arms at one of their ends and likewise attached to a clutch housing on the main shaft at the other end.

5. In a self-governing wind motor, the combination of a main shaft, a pair of spaced horizontal main frames affixed to said shaft, vertical rods mounted at opposite outer portions of the main frames, spaced horizontal vane arms mounted on each of the aforesaid vertical rods, springs on each of the vertical rods, each spring having one end adjustably secured to its vertical rod and having the other end attached to the adjacent horizontal frame, vane rods at the opposite outer extremities of each of the aforesaid vane arms, flexible curved vanes of sheet metal extending from the vane rod of one of the vane arms to the corresponding vane rod of the other vane arm and having the ends of the vanes loosely mounted on said rods, a crank arm affixed on the ends of each of the opposite vertical rods of the main frames, curved arms pivotally connected to the outer ends of said crank arms at one of their ends and likewise attached to a clutch housing on the main shaft at the other end, and means for stopping and starting the wind motor.

6. In a self-governing wind motor, the combination of a main shaft, a plurality of spaced horizontal main frames affixed to said shaft, vertical rods mounted at opposite portions of the main frames, spaced horizontal vane arms mounted on each of the aforesaid vertical rods, automatic vane adjusting mechanism operatively connected with each of the vertical rods, vane rods at the opposite outer extremities of each of the aforesaid vane arms, and curved vanes of sheet metal extending from the vane rod of one of the vane arms to the corresponding vane rod of the other vane arm and having the ends of the vanes loosely mounted on said rods.

7. In combination with the apparatus defined in claim 6, a crank arm affixed on the lower end of each of the vertical rods in the main frame, arms pivotally connected to the other ends of said crank arms at one of their ends and pivotally attached to a clutch housing on the main shaft at the other end, and the aforesaid clutch housing.

CHARLES ALVAH PRESSNALL.